US006193299B1

United States Patent
Than (10) Patent No.: US 6,193,299 B1
(45) Date of Patent: Feb. 27, 2001

(54) SIDE TARPAULIN TIGHTENER AND TARPAULIN MOUNTING STRUCTURE AND TARPAULIN IN CONJUNCTION THEREWITH

(75) Inventor: Johannes Than, Sundern-Endorf (DE)

(73) Assignee: Franz Miederhoff OHG, Sundern (DE)

( * ) Notice: Subject to any disclaimer, the term of this patent is extended or adjusted under 35 U.S.C. 154(b) by 0 days.

(21) Appl. No.: 09/545,387

(22) Filed: Apr. 7, 2000

(30) Foreign Application Priority Data

Apr. 9, 1999 (DE) ............................................... 199 15 927
Aug. 10, 1999 (DE) .......................................... 299 13 954 U (51) Int. Cl.⁷ ..................................................... B60J 11/00
(52) U.S. Cl. ..................................... 296/100.15; 160/328
(58) Field of Search ...................... 296/100.01, 100.15; 160/328, 327

(56) References Cited

U.S. PATENT DOCUMENTS 5,466,030 * 11/1995 Harris et al. ................. 296/100.15 X
5,758,922 * 6/1998 Wheatley ......................... 296/100.15
5,984,379 * 11/1999 Michel et al. .............. 298/100.15 X

FOREIGN PATENT DOCUMENTS

4415042 C1 4/1995 (DE).

0081837A2 1/1983 (EP).

* cited by examiner

*Primary Examiner*—Joseph D. Pape
(74) *Attorney, Agent, or Firm*—Flanagan & Flanagan; John R. Flanagan; John K. Flanagan (57) ABSTRACT

A side tarpaulin tightener for tensioning a tarpaulin to a mounting structure includes a tension lever-hook module and an adjustment unit. The tension lever-hook module has a tension lever pivotally articulated about a first pivot axis and a hook pivotally articulated about a second pivot axis on the tension lever being spaced apart from and parallel to the first pivot axis. The adjustment unit is pivotally articulated about the first pivot axis on the tension lever and has a base element attached on the tarpaulin and an elongated rod at one end being pivotally coupled to the tension lever at the first pivot axis thereof and at an opposite end being connected to the base element such that a tensioning movement can be transmitted to the tarpaulin as a result of an upward movement of the hook and an opposite downward movement of the adjustment unit relative to the hook in response to an upward closing pivotal movement of the tension lever. Thus, both the tension lever and hook of the tension lever-hook module are pivotally articulated relative to the adjustment unit. The first and second pivot axes of the tension lever and hook are spaced apart from one another such that the distance between them determines the extent through which the hook and adjustment unit can be moved for tensioning the tarpaulin on the mounting structure.

22 Claims, 6 Drawing Sheets

(PRIOR ART)

SIDE TARPAULIN TIGHTENER AND TARPAULIN MOUNTING STRUCTURE AND TARPAULIN IN CONJUNCTION THEREWITH

BACKGROUND OF THE INVENTION

1. Field of the Invention

The present invention relates to a side tarpaulin tightener, such as used on a mounting structure of a utility motor vehicle for tensioning a tarpaulin, which includes a pivotal tension lever and a hook and adjustment unit separately pivotally articulated to the tension lever such that an upward closing pivotal movement of the tension lever causes an upward movement and an engagement of the hook under the mounting structure and an oppositely directed downward movement of the adjustment unit and tarpaulin attached thereto so as to tension the tarpaulin in a manner that avoids formation of folds in the tarpaulin.

2. Description of the Prior Art

Side tarpaulin tighteners are commonly used for tensioning a tarpaulin to a utility motor vehicle tarpaulin mounting structure. One prior art type of side tarpaulin tightener includes a tension lever-hook module having a tension lever and a hook. The tension lever is structured as a one-armed lever pivotably articulated about a pivot axis. The hook extends behind a stationary element that serves as an abutment against which a tarpaulin can be tensioned. The side tarpaulin tightener also includes means for the transmission onto the tarpaulin of a tensioning movement exerted by the tension lever.

Such prior art type of side tarpaulin tightener is known from German patent document No. DE 44 15 042 C1. The prior art side tarpaulin tightener disclosed in this document employs a tension lever-hook module which is disposed at the free end of an adjustable belt attached onto the tarpaulin. The tension lever-hook module includes a tension lever structured as a flap which is articulated on an approximately U-shaped subcomponent in the region of two parallel flanks thereof so as to be pivotable about a pivot axis. Also, a hook is formed on the subcomponent which serves for extending behind a stationary element, for example the lower edge of a frame profile of a utility motor vehicle mounting structure, that serves an abutment for the tarpaulin is to be tensioned. In an engaged condition of the hook, for example in which it extends behind the frame profile, the side of the subcomponent facing away from the tension lever rests on the outside of the tarpaulin and is supported on the outside of the frame profile. The pivot axis of the tension lever is formed by a pin about which the free end of the belt is wrapped forming a loop. The other end of the belt is attached to the tarpaulin to be tensioned. Spaced apart from its pivot axis, the tension lever has a tension bar in the region of a lever arm of the tension lever. The belt loop is guided across the tension bar on the tension lever. When pivoting the tension lever in a downward direction from an open position into a closed position, a tightening of the belt occurs due to the deflection of the belt loop across the tension bar spaced apart from the pivot axis. In its closed position the tension lever is held by a latching mechanism against an unintentional opening or snapping of the tension lever in an upward direction.

Even if this prior art side tarpaulin tightener is satisfactory and can be safely used, it has disadvantages which must nevertheless be accepted. Due to a manipulation of the tension belts, which cannot be excluded, such side tarpaulin tightener does not meet the prerequisites for use as a customs seal. Moreover, it may happen that the tension lever in its closed position is not latched as accordingly authorized. Due to the effect of the air stream, a flapping of the tarpaulin can occur in which the tarpaulin beats against the tension belt which, in turn, can lead to the tension lever snapping upward from its closed position. Consequently, the hook becomes detached from its engaged condition such that the entire tension lever-hook module disposed at the end of the tension belt is no longer secured in position and can swing freely at the outside, for example, of a utility motor vehicle mounting structure. For adjusting the side tarpaulin tightener with respect to the tensional force to be brought onto the tarpaulin, the free end forming the loop of the tension belt is correspondingly adjusted. Due to the textile material of the tension belts, an adjustment of the belt can only be carried out with difficulty in cold ambient temperatures due to the resulting stiffness of the material.

A further disadvantage of this prior art side tarpaulin tightener is that the handling of the tightener for causing its operation is only possible by using both hands. Opening the side tarpaulin tightener must be carried out with both hands since one hand must be used to release the latching mechanism as the other hand guides the movement of the tension lever in order to prevent uncontrolled upward snapping of the tension lever due to the tensile stress applied on it. The opened tension lever subsequently projects from the subcomponent abutting at its underside on the tarpaulin or the frame profile. Although, now with the side tarpaulin tightener in its opened position, tension stress is removed from the hook such that the hook can be brought out of its engaged condition in which it extends behind the frame profile, the hook continues to be in the same plane in which it extends behind the frame profile. If the tarpaulin must now be rolled upwardly in order to open the utility motor vehicle mounting structure, the individual side tarpaulin tighteners must first be swung out of their neutral position in contact on the frame profile, in order for the hooks not to extend behind the frame profile when the tarpaulin is lifted.

In the case of such prior art side tarpaulin tightener, during tensioning of the tightener by downward pivoting of the tension lever, the subcomponent supported on the outside of the tarpaulin together with the hook are moved upwardly in a vertical direction relative to the frame profile which brings the hook into the engaged condition in which it extends behind the frame profile. As a consequence of this movement and as the tarpaulin is being tensioned, a fold can form in the tarpaulin in front of the subcomponent such that the purpose for using the side tarpaulin tightener, namely the tensioning of a tarpaulin over its entire height, is counteracted. Such folds can lead to a flapping of the tarpaulin due to the air stream which is undesirable.

Consequently, there is a need for further development of a side tarpaulin tightener of the above type such that not only its handling ability for opening the tarpaulin is improved but also its tensioning of the tarpaulin without the formation of folds is possible.

SUMMARY OF THE INVENTION

The present invention overcomes the aforementioned problems by providing a side tarpaulin tightener having a tension lever-hook module and an adjustment unit. The tension lever-hook module includes a tension lever pivotally articulated about a first pivot axis and a hook pivotally articulated about a second pivot axis on the tension lever being spaced apart from and parallel to the first pivot axis. The adjustment unit is pivotally articulated about the first pivot axis on the tension lever and includes a base element attached on the tarpaulin and an elongated member at one end being pivotally coupled to tension lever at the first pivot axis thereof and at an opposite end being connected to the base element such that a tensioning force can be transmitted to the tarpaulin as a result of an upward movement of the hook against a stationary abutment and an opposite downward movement of the adjustment unit relative to the hook in response to an upward closing pivotal movement of the tension lever. Thus, in the side tarpaulin tightener of the present invention both the tension lever and hook of the tension lever-hook module are pivotably articulated relative to the adjustment unit. The first and second pivot axes of the tension lever and hook are spaced apart from one another such that the distance between them determines the extent through which the hook and adjustment unit can be moved for tensioning the tarpaulin.

Through this construction of the side tarpaulin tightener, during the upward movement of the tension lever for closing the side tarpaulin tightener, oppositely directed movements thus take place between the hook and the base element of the adjustment unit supported, for example, on the outside of the tarpaulin. Through the downwardly directed movement of the base element the tarpaulin is also moved downwardly such that the formation of a fold, as occurs in the case with the prior art tightener, is not now possible.

In the side tarpaulin tightener of the present invention, a direct connection of the base element on the tarpaulin is made possible by the cooperation that occurs between the pivotably articulated tension lever and the hook articulated thereon. As a consequence, no tension belts need to be used in the side tarpaulin tightener of the present invention. This permits the side tarpaulin tightener to be disposed barely outside of the suspension axis of the side tarpaulin such that when the side tarpaulin tightener is open any tendency of the hook to seek a neutral position behind the abutment of the frame profile is counteracted. Through the pivotable disposition of the hook on the tension lever at the second pivot axis and its spacing from the first pivot axis of the tension lever and additionally from the frame profile, the hook will be carried by and moved with the tension lever away from the frame profile during the process of opening the tension lever. The tension lever is usefully adjusted with respect to the tarpaulin such that it projects only slightly from the base element. Consequently, through such a measure any tendency of the hook to seek a neutral position under the frame profile is also counteracted.

Therefore, to open the side tarpaulin, it is basically only necessary to open the side tarpaulin tightener itself. As explained above, the hook is outside of the latching position where it extends behind the frame profile. Subsequently, the side tarpaulin can be pulled upwardly or shifted laterally without needing to fear that the hooks of the side tarpaulin tighteners will again swing into their latching positions.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
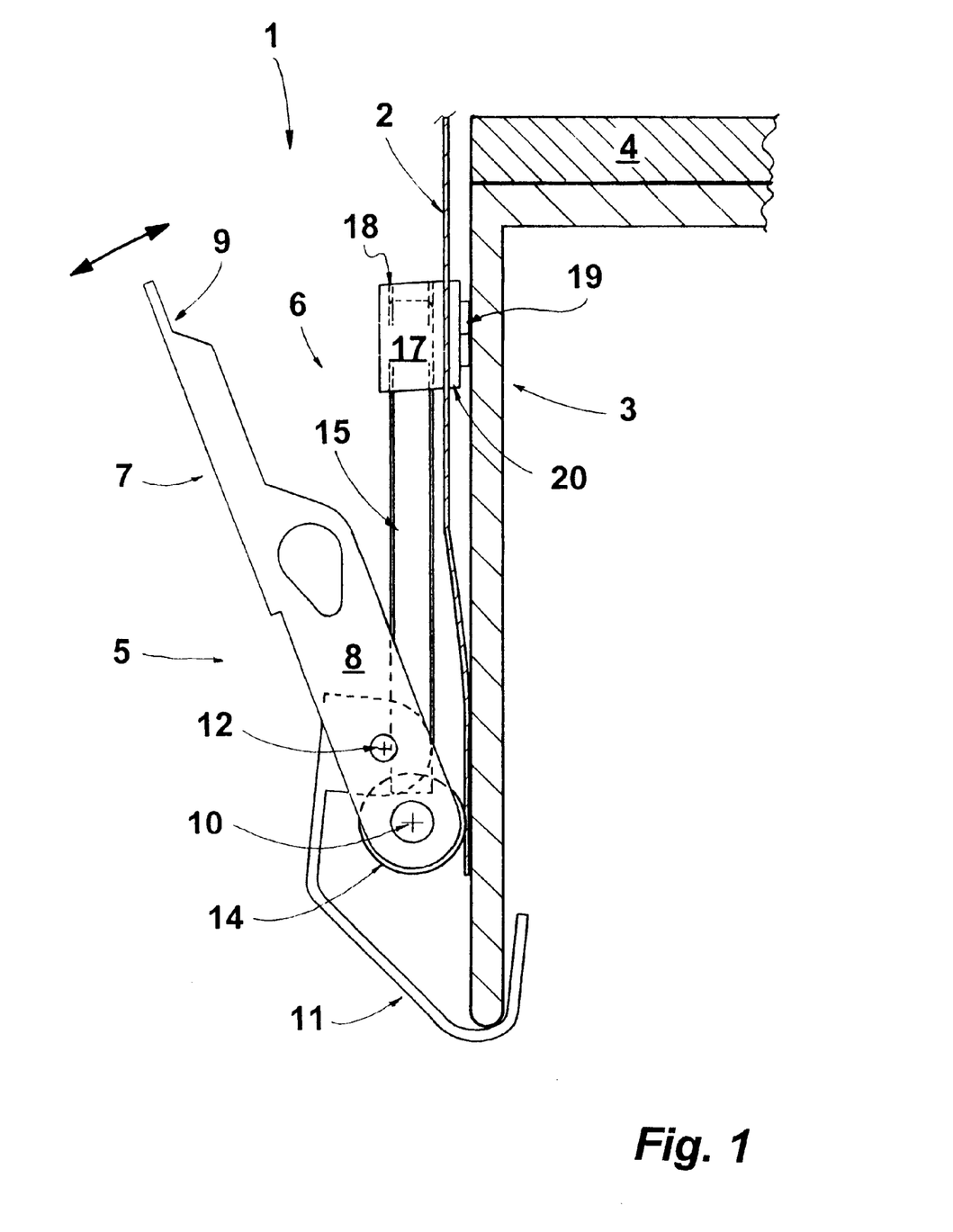
FIG. 1 is a side elevational view of one embodiment of a side tarpaulin tightener of the present invention in which the tightener is shown displaced outwardly from a closed position wherein it would tension a tarpaulin to a utility motor vehicle mounting structure.
Figure 2:
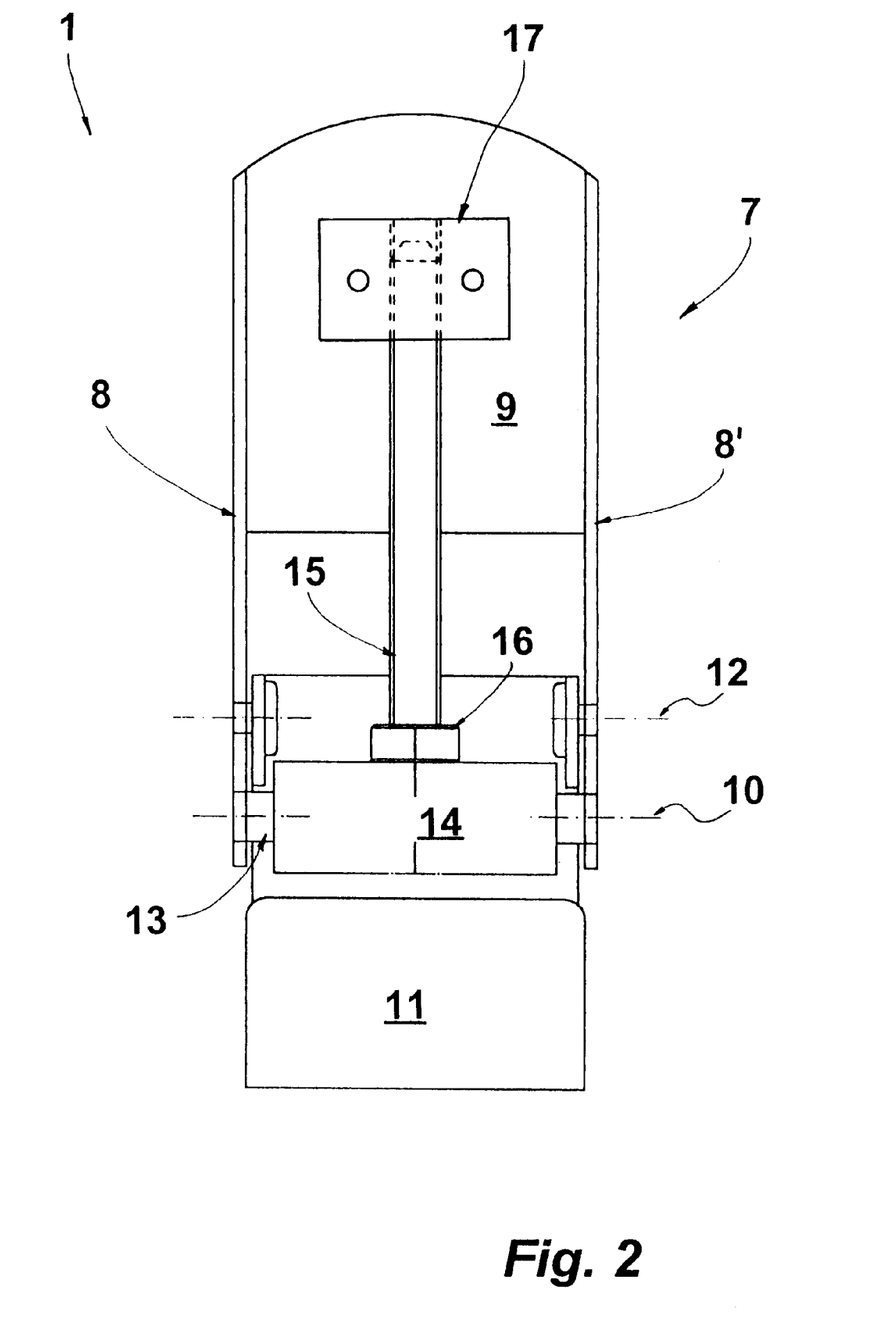
FIG. 2 is a rear view of the side tarpaulin tightener of FIG. 1 as seen when one is facing left away from the exterior of the mounting structure.

Referring to the drawings and particularly to FIGS. 1 and 2, there is illustrated one embodiment of a side tarpaulin tightener of the present invention, generally designated 1, disposed in the region of a lower end of a tarpaulin 2 and adjacent to a lower shank of a mounting structure, such as on a utility motor vehicle. The mounting structure includes a frame profile 3 and a bottom plate 4 disposed thereon. The frame profile 3 has an L-shaped configuration and the downwardly pointing lower shank serves as an abutment for securing thereon the side tarpaulin tightener 1 in a desired position relative to the mounting structure.

Figure 3:
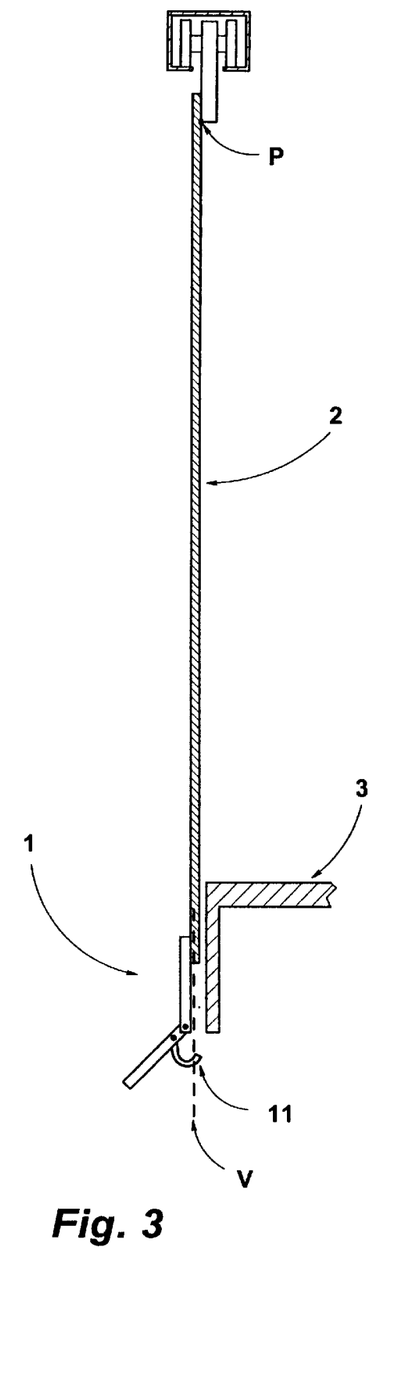
FIG. 3 is a schematic representation of the side tarpaulin tightener of FIG. 1 showing the tightener disposed in an opened position at a lower end of a tarpaulin adjacent to the mounting structure wherein the tension is released on the tarpaulin.

The side tarpaulin tightener 1 basically includes a tension lever-hook module 5 and an adjustment unit 6. The tension lever-hook module 5 includes a tension lever 7 having an outer end portion pointing upwardly in FIG. 1. The outer end portion of the tension lever 7 is structured as a flap having a pair of opposing side walls 8, 8' which provide it with a generally U-shaped configuration in cross section. The two side walls 8, 8' are interconnected with one another by a lever plate 9, as seen in FIG. 2, being provided in the region of the outer end portion of the tension lever 7. The tension lever 7 so constructed as a single-arm lever is pivotably disposed about a first pivot axis 10 such that the tension lever 7 can be pivoted, according to the direction of the arrow in FIG. 1, between a closed position adjacent to the tarpaulin 2 or an opened position angularly displaced away from the closed position, as shown in FIG. 3. The side walls 8, 8' serve also for the articulation of a hook 11 of the tension lever-hook module 5. The hook 11 is pivotably disposed about a second pivot axis 12 via bearing pins pivotally coupled to the side walls 8, 8' of the tension lever 7. The second pivot axis 12 is spaced outwardly from the first pivot axis 10 of the tension lever 7. The first pivot axis 10 of the tension lever 7 is formed by a pivot pin 13. The pivot pin 13 is supported in an annular, preferably cylindrical, collar 14 whose radius is greater than the radius of the pivot pin 12 and the height of each side wall 8, 8' in the region of the first pivot axis 10 such that the outer surface of the cylindrical collar 14 is in contact with the outside of the tarpaulin 2 or the frame profile 3. Moving or "throwing" the tension lever 7 upwardly from its lower opened position into its upper closed position about the first pivot axis 10 can be facilitated by side walls 8, 8' of the tension lever 7 in the region of the first pivot axis 10 being rounded in their rearward portions so as to form, in the absence of the collar 14, a seat or fulcrum against the outside of the tarpaulin 2 or of the lower shank of the frame profile 3. Such movement is further facilitated by the enlargement of the contact area and the guidance provided the cylindrical collar 14. During the tensioning of the tarpaulin 2 provided by the upward movement of the tension lever 7, the latter braces itself via the contact of the outer surface of the collar 14 on the outside of the tarpaulin 2 or of the frame profile 3.

The adjustment unit 6 includes an elongated member preferably in the form of a threaded rod 15 which at one end is screwed into the outer surface of the cylindrical collar 14 and is snug-fit therewith by a lock nut 16. The adjustment unit 6 also includes a base element in the form of a lug 17 fastened on the tarpaulin 2 and providing an adjustment nut having inner threads 18 which receive and engage with the other end of the threaded rod 15. The lug 17 is fastened on the outside of the tarpaulin 2 through the use of any suitable means, such as two fastening screws 19 and a counter lug 20. Alternatively, the lug 17 can be connected with the tarpaulin 2 by being riveted onto the tarpaulin 2.

The tensioning force to be applied onto the tarpaulin 2 by the tension lever-hook module 5 can be adjusted by adjusting the threaded rod 15 with respect to the lug 17 of the adjustment unit 6. The adjustment of the length of the side tarpaulin tightener 1 with respect to the tarpaulin 2, and thus of the tensioning force applied to the tarpaulin 2 by the module 5, is carried out by screwing the threaded rod 15 with the tension lever-hook module 5 disposed thereon into or out of the inner threads 18 of the lug 17. Unlike with the prior art tightener using the belt, in the case of the tightener 1 having the adjustment unit 6 with the threaded rod 15 such an adjustment is not made any more difficult due to temperature fluctuations. Also, instead of providing length adjustability of the tightener 1 by means of the adjustment unit 6 having the threaded rod 15 and lug 17, it can also be provided by equipping the adjustment unit 6 with snap-in means.

Figure 4:
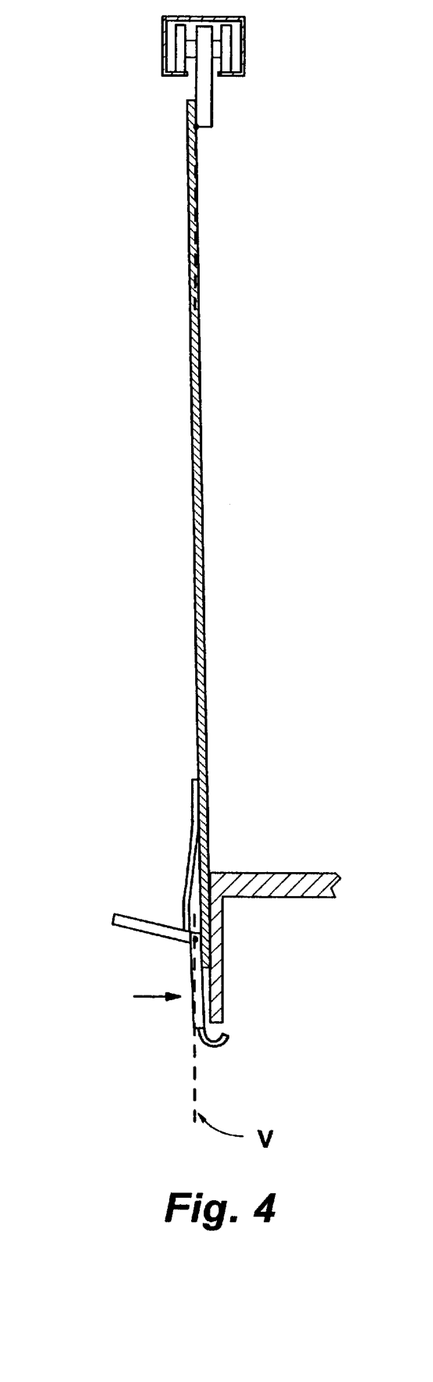
FIG. 4 is a schematic representation similar to that of FIG. 3 but showing a prior art side tarpaulin tightener in an opened position.

The representation of the side tarpaulin tightener 1 in FIG. 3 makes clear that by fastening the side tarpaulin tightener 1 on the tarpaulin 2, essentially in the plane of the outer surface of tarpaulin 2, the tarpaulin 2 is suspended essentially vertically. The vertical plane is shown in FIG. 3 by a dashed line and denoted by V. The pendulum axis of the tarpaulin 2 is marked by P. In its unhooked position shown in FIG. 3, in contrast to its hooked-in position shown in FIG. 1, the hook 11 is spaced apart from the frame profile 3 by the offset or distance between the first and second pivot axes 10, 12. In comparison, in FIG. 4 is schematically shown a prior art side tarpaulin tightener disposed on a side tarpaulin in its opened position. The vertical plane of the tarpaulin is again shown in dashed line form. In particular, the projecting-out tension lever in its opened position is responsible for the swinging-in of the subcomponent with the hook formed thereon into its position in which it is in contact on the frame profile such that rolling-up of the tarpaulin, as described earlier, is not readily possible.

In its opened position as shown in FIG. 3, the tension lever 7 of the side tarpaulin tightener 1 is disposed in a position in which it is completely pivoted downward. In this position the hook 11 for tensioning the tarpaulin 2 can be moved to and hooked behind the downwardly directed shank of the frame profile 3. During the subsequent closing of the tension lever 7, a relative movement, directed oppositely, takes place between the hook 11 articulated on the tension lever 7 and the adjustment unit 6 also articulated on the tension lever 7 such that during this movement the tarpaulin 2 is pulled downwardly with the adjustment unit 6 and the formation of folds in the tarpaulin 2 is avoided. In its closed position the tension lever 7 rests parallel to the tarpaulin 2 on its outside and covers the adjustment unit 6. Also, in the closed position of the tension lever 7, the second pivot axis 12 of the hook 11 is located at a shorter distance from the tarpaulin 2 than is the first pivot axis 10 of the tension lever 7. Consequently, the side tarpaulin tightener 1 is also constructed as an over-center point tensioner such that any additional latching of the tension lever 7 is not required. Flapping of the tarpaulin 2 cannot lead to the opening or to the undesired snapping up of the tension lever 7 to its opened position, since in the event of such flapping the tarpaulin 2 with the adjustment unit 6, and thus with the tension lever 7, moves or flaps such that the entire side tarpaulin tightener 1 is moved along with the tarpaulin 2 and not just the tension lever is moved as in the case of the prior art. Furthermore, to avoid manipulation on the adjustment unit 6 fastened on the tarpaulin 2, it is useful, as shown in FIGS. 1 and 2, to dispose the lug 17 of the adjustment unit 6 in a region of the tarpaulin 2 which opposes the outside of the frame profile 3.

As mentioned above, the tensioning of the tarpaulin 2 takes place by moving the tension lever 7 from a lower opened position to an upper closed position. By applying a sufficiently high tensioning force to the tarpaulin 2, flapping of the tarpaulin 2 can be largely prevented. It is also useful that the adjustment unit 6 in the closed position of the tension lever 7 is covered or concealed by it such that accessibility to the adjustment unit 6 is not possible.

Figure 5:
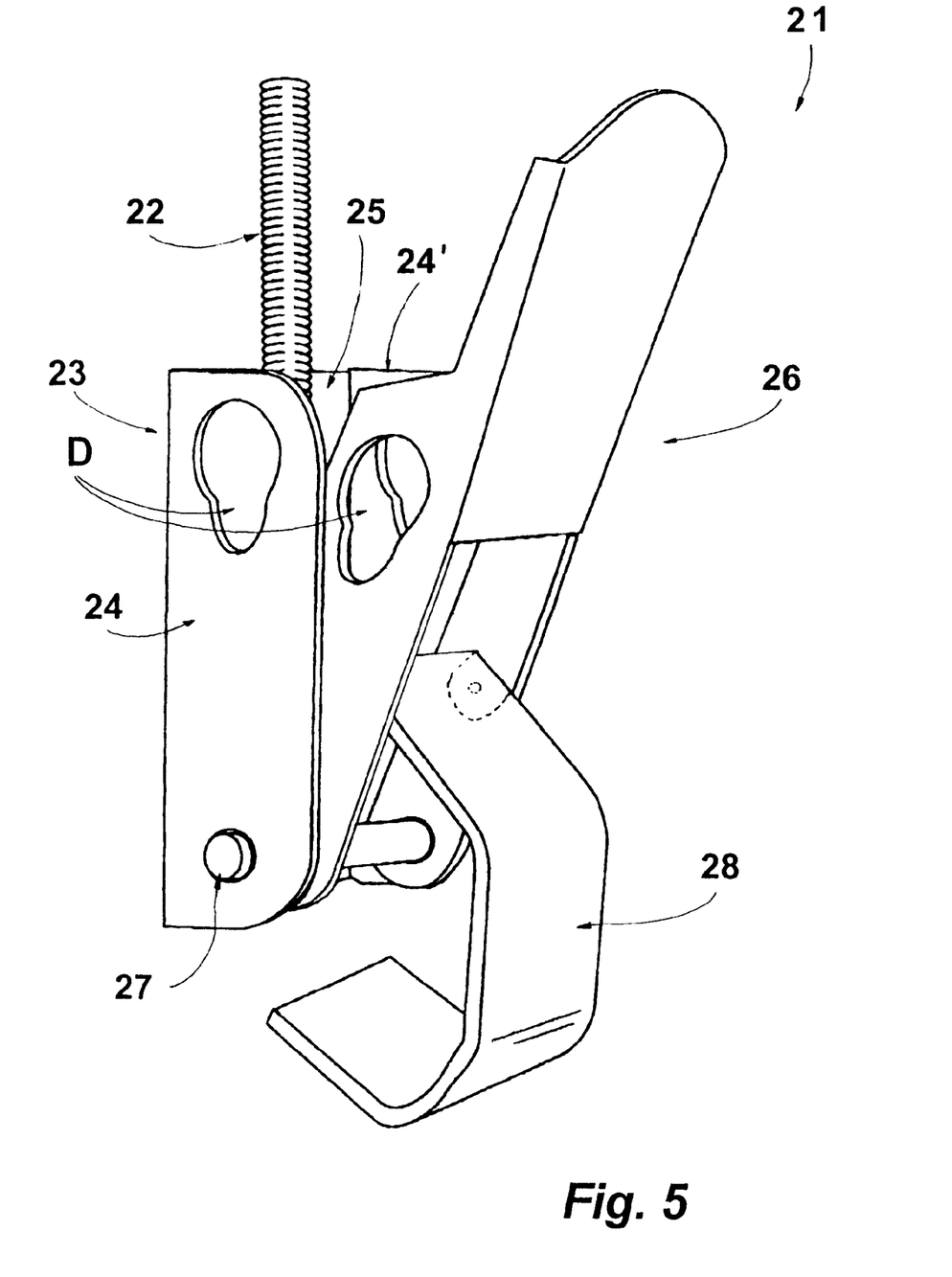
FIG. 5 is a perspective view of another embodiment of the side tarpaulin tightener of the present invention showing it disposed in an opened position.
Figure 6:
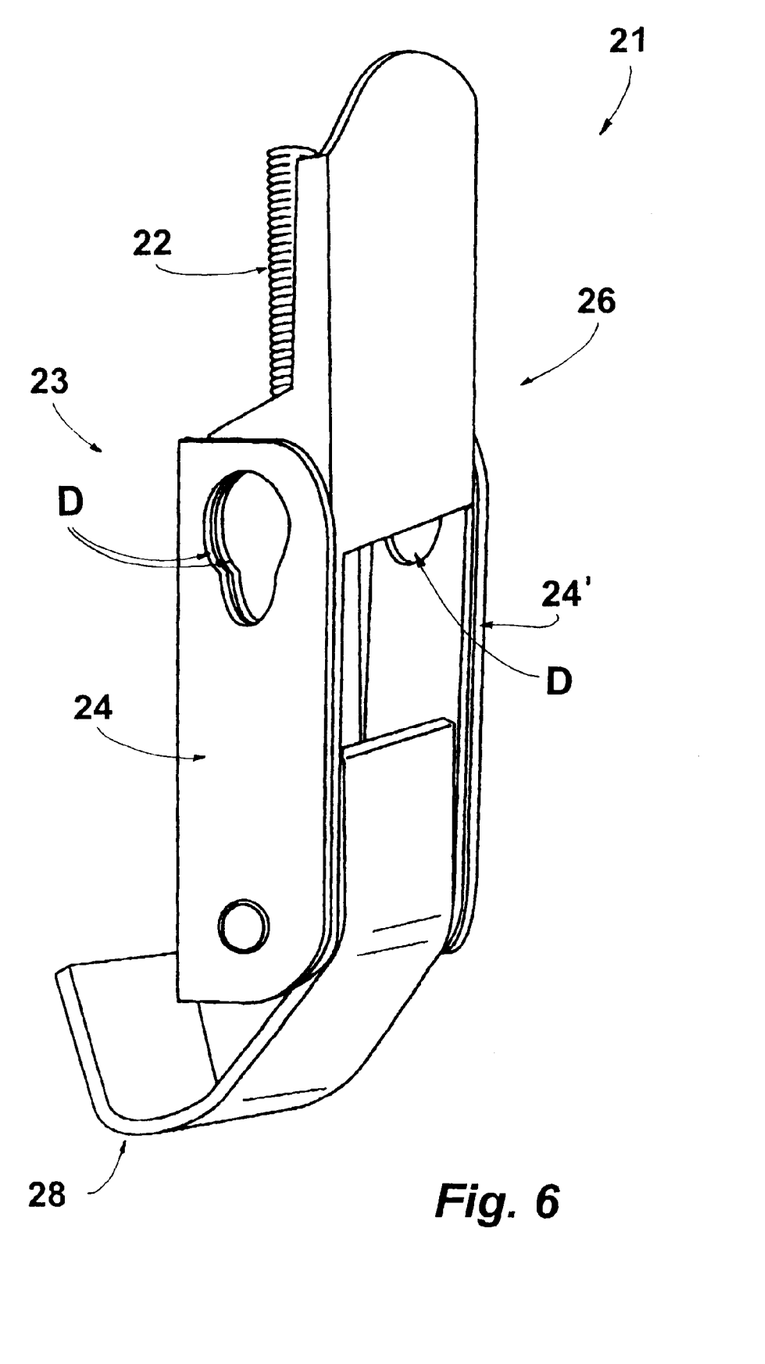
FIG. 6 is a perspective view of the tightener of FIG. 6 showing it disposed in a closed position.

The tension lever-hook module 5 having the one embodiment shown in FIGS. 1 and 2 is not authorized for a customs seal. In FIGS. 5 and 6, a further tension lever-hook module 21 of a side tarpaulin tightener is shown, which tension lever-hook module 21 can be used within the scope of a customs seal of a utility motor vehicle mounting structure. In principle, the tension lever-hook module 21 is constructed corresponding to that of FIGS. 1 and 2. For cooperating with the tension lever-hook module 21 but not shown in FIGS. 5 and 6, a lug is provided corresponding to the lug 17. Here again, a threaded rod 22 is provided as part of the adjustment unit for cooperating with the lug (not shown) that is secured in position on the tarpaulin. The threaded rod 22 extends into a receiver 23 which is constructed by a pair of side walls 24, 24' interconnected by a base plate 25 to provide the receiver 23 with a U-shaped cross-sectional configuration. The distance between the side walls 24, 24' is slightly greater than the width of the tension lever 26 of the tension lever-hook module 21. The tension lever 26 is pivotably articulated on the receiver 23 by using a pivot pin 27. The receiver 23 represents a rigid extension of the threaded rod 22 and thus the element of the adjustment unit associated with the tension lever-hook module 21. As is also the case with the subject matter of the tension lever-hook module 5 of FIGS. 1 and 2, the hook 28 of this tension lever-hook module 21 is pivotably articulated on the lever arm portion of the tension lever 26. The threaded rod may also extend resiliently away from the receiver 23 by using a compression spring. Such a configuration is useful if additionally via the compression spring a tensioning is to be applied onto the tarpaulin.

As shown in FIGS. 5 and 6, into the side walls of the tension lever 26 as well as into the side walls 24, 24' of the receiver 23, breakthroughs D are introduced which are aligned in the closed position of the tension lever 26. In this closed position, a custom seal rope (not shown) can be guided through the aligned breakthroughs D such that opening of the tension lever 26 is prevented. Based on the closed position of the tension lever-hook module 21 shown in FIG. 6, it is evident the tension lever 26 completely covers the adjustment unit, here indicated only by the threaded rod 22, such that manipulations of the lug cooperating with the threaded rod 22 is also not possible. Consequently a side tarpaulin tightener with the tension lever-hook module 21 of FIGS. 5 and 6 meets the prerequisites for its use as a customs seal.

Figure 7:
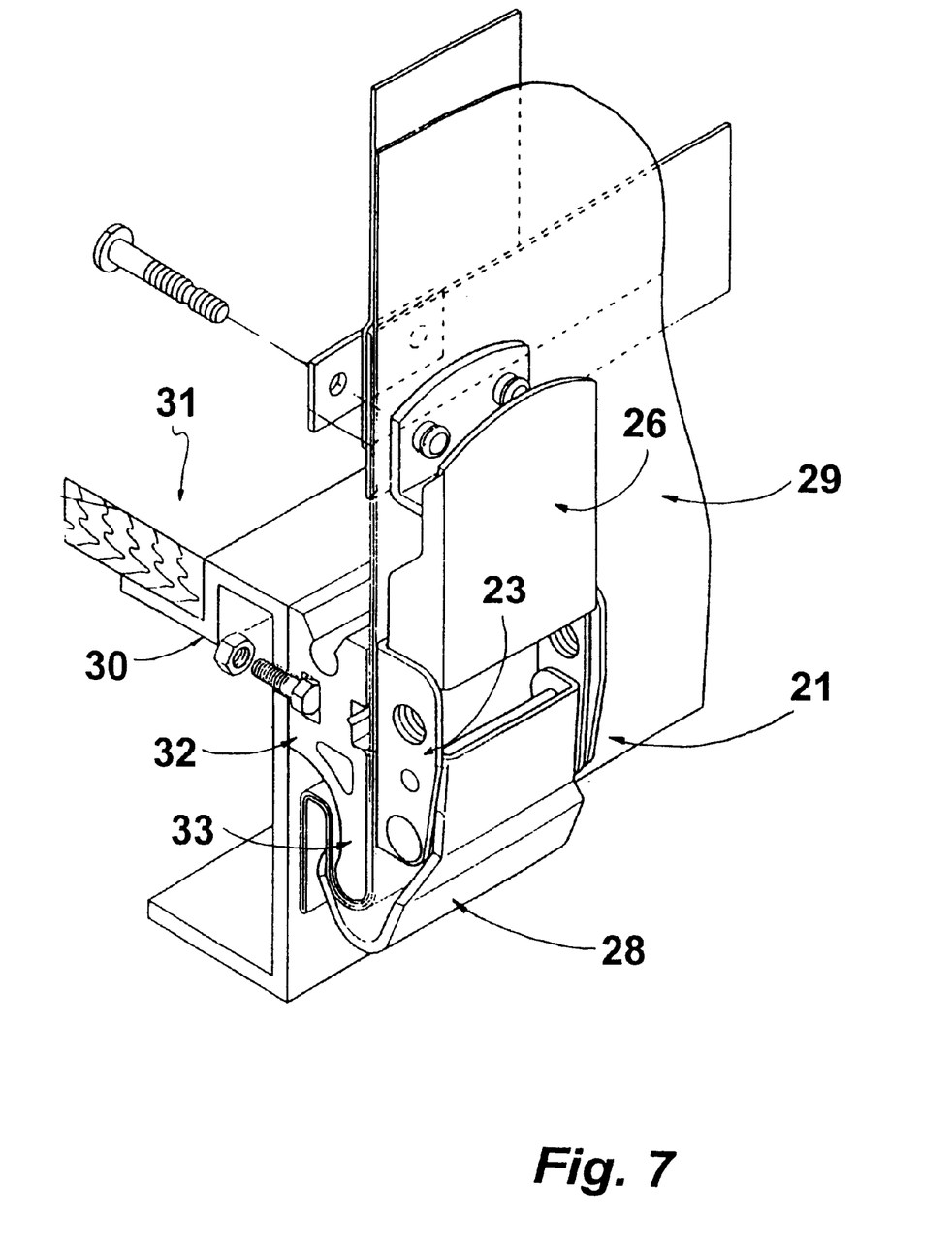
FIG. 7 is a perspective view of the tightener of FIGS. 5 and 6 showing it disposed on a tarpaulin.

Referring to FIG. 7, the side tarpaulin tightener of FIGS. 5 and 6 is attached at the lower end of a side tarpaulin 29 and disposed adjacent to a utility motor vehicle mounting structure which includes an outer frame 30 and a bottom plate 31 held by the outer frame 30. On the outer frame 30 is disposed a profile 32 with a clamping shank 33 projecting downwardly. The clamping shank 33 serves to provide an abutment behind which the hook 28 extends in the tensioned position of the tension lever-hook module 21 of the side tarpaulin tightener 21. The tarpaulin 29 is longer than the lower termination of the hook 28 such that the lower tarpaulin segment, forming an S-form layout, can extend into the undercut formed by the clamping shank 33. The hook 28 is supported on the inner region of the clamping shank 33 on the outer surface of the tarpaulin 20 such that when the tension lever 26 is thrown, the relative movement directly oppositely between the receiver 23 and the hook 28 can be used for the additional tensioning of the tarpaulin 29 without needing to fear the formation of a fold. Through the jamming of the lower tarpaulin segment through the hook 28 on the clamping shank 33 and the formation of the S-layout an effective sealing against ascending slashing of water is formed.

Providing a side tarpaulin tightener having the above-described constructions, moreover, also provides for subsequent interchangeability of the tension lever-hook modules. For example, a utility motor vehicle tarpaulin 2 which is equipped with tension lever-hook modules 5 that are not customs seals-worthy can be readily exchanged for ones which are suitable for customs seals. When using the threaded rod and lug 15, 17, this exchange takes place by unscrewing the threaded rod, with the tension lever-hook module 5 disposed thereon, from the lug 17 fastened on the tarpaulin 2 and subsequently screwing into the lug 17 the other modules.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A side tarpaulin tightener for tensioning a tarpaulin to a mounting structure, said tightener comprising:
   (a) a tension lever-hook module having a tension lever pivotally articulated about a first pivot axis and a hook pivotally articulated about a second pivot axis on said tension lever being spaced apart from and parallel to said first pivot axis thereof; and
   (b) an adjustment unit having a base element for attachment on a tarpaulin and an elongated member having a pair of opposite ends, said elongated member at one of said opposite ends being pivotally coupled to said tension lever at said first pivot axis thereof and at the other of said opposite ends being connected to said base element such that when said base element is attached on said tarpaulin a tensioning force can be transmitted to the tarpaulin as a result of an upward movement of said hook against a stationary abutment and an opposite downward movement of said adjustment unit relative to said hook in response to an upward closing pivotal movement of said tension lever.

2. The tightener of claim 1 wherein said first pivot axis of said tension lever is formed by a pivot pin supported by an annular collar whose radius is greater than said radius of said pivot pin such that an outer surface of said collar bears against the stationary abutment as said tension lever is pivoted from an opened position to a closed position.

3. The tightener of claim 2 wherein said second pivot axis of said hook is spaced outwardly from said first pivot axis of said tension lever when said tension lever is at said opened position and is moved over and past said first pivot axis and closer to the stationary abutment than said first pivot axis as said tension lever is pivotally moved from said opened position to said closed position so as to provide an over center point latching of said tension lever at said closed position.

4. The tightener of claim 1 wherein said tension lever has a pair of opposing side walls between and to which said hook is pivotally coupled so as to define said second pivot axis.

5. The tightener of claim 4 wherein said first pivot axis of said tension lever is formed by a pivot pin supported by an annular collar whose radius is greater than said radius of said pin and heights of said side walls such that an outer surface of said collar protrudes beyond said side walls and bears against the stationary abutment so as to facilitate said upward closing pivotal movement of said tension lever.

6. The tightener of claim 5 wherein said second pivot axis of said hook is spaced outwardly from said first pivot axis of said tension lever when said tension lever is at said opened position and is moved over and past said first pivot axis and closer to the stationary abutment than said first pivot axis when said tension lever is pivotally moved from said opened position to said closed position so as to provide an over center point latching of said tension lever at said closed position.

7. The tightener of claim 5 wherein said side walls of said tension lever adjacent to said first pivot axis thereof are rounded to facilitate said upward closing pivotal movement of said tension lever.

8. The tightener of claim 2 wherein said elongated member of said adjustment unit is a threaded rod which at said one end is screwed into an outer surface of said collar.

9. The tightener of claim 1 wherein said base element includes a lug and means for fastening said lug on the tarpaulin.

10. The tightener of claim 1 wherein said elongated member is a threaded rod which at said other end is screwed into inner threads formed in said base element.

11. The tightener of claim 10 wherein said tensioning force to be applied to the tarpaulin by said tension lever-hook module can be adjusted through adjustment of said threaded rod with respect to said base element of said adjustment unit by screwing said threaded rod into or out of said inner threads of said base element.

12. The tightener of claim 1 wherein said tension lever overlies and substantially conceals and prevents access to said adjustment unit when said tension lever is at said closed position.

13. The tightener of claim 1 wherein said adjustment unit includes a receiver having a pair of lateral walls on which said tension lever is pivotably articulated about said first pivot axis and between which said tension lever is received in said closed position thereof.

14. The tightener of claim 13 wherein said tension lever has a pair of opposite side walls with breakthroughs defined in said side walls of said tension lever and in said lateral walls of said receiver, said breakthroughs being aligned with one another for receiving a customs seal rope therethrough when said tension lever is in said closed position relative to said receiver.

15. In conjunction with a tarpaulin and a stationary abutment of a mounting structure on a utility motor vehicle, at least one side tarpaulin tightener for tensioning said tarpaulin to said stationary abutment of said mounting structure, said tightener comprising:

(a) a tension lever-hook module having a tension lever pivotally articulated about a first pivot axis and a hook pivotally articulated about a second pivot axis on said tension lever being spaced apart from and parallel to said first pivot axis thereof; and (b) an adjustment unit having a base element attached on said tarpaulin and an elongated member having a pair of opposite ends, said elongated member at one of said opposite ends being pivotally coupled to said tension lever at said first pivot axis thereof and at the other of said opposite ends being connected to said base element such that a tensioning force is transmitted to said tarpaulin as a result of an upward movement of said hook against said stationary abutment of said mounting structure and an opposite downward movement of said adjustment unit relative to said hook in response to an upward closing pivotal movement of said tension lever.

16. The tightener of claim 15 wherein said second pivot axis of said hook is spaced outwardly from said first pivot axis of said tension lever when said tension lever is at said opened position and is moved over and past said first pivot axis and closer to said stationary abutment than said first pivot axis as said tension lever is pivotally moved from said opened position to said closed position so as to provide an over center point latching of said tension lever at said closed position.

17. The tightener of claim 15 wherein said first pivot axis of said tension lever is formed by a pivot pin supported by an annular collar whose radius is greater than said radius of said pivot pin such that an outer surface of said collar bears against said stationary abutment as said tension lever is pivoted from an opened position to a closed position.

18. The tightener of claim 15 wherein said elongated member is a threaded rod which at said other end is screwed into inner threads formed in said base element.

19. The tightener of claim 18 wherein said tensioning force to be applied to said tarpaulin by said tension lever-hook module can be adjusted through adjustment of said threaded rod with respect to said base element of said adjustment unit by screwing said threaded rod into or out of said inner threads of said base element.

20. The tightener of claim 15 wherein said tension lever overlies and substantially conceals and prevents access to said adjustment unit when said tension lever is at said closed position.

21. The tightener of claim 15 wherein said stationary abutment includes a clamping shank and said hook is disposed about said clamping shank with a lower terminal segment of said tarpaulin held therebetween when said tension lever is at said closed position.

22. The tightener of claim 15 wherein said stationary abutment defines a vertical plane and said hook is supported by said tension lever away from said vertical plane when said tension lever is at said opened position.

* * * * *